UNITED STATES PATENT OFFICE.

HOWARD W. MATHESON, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

METHOD OF PRODUCING CONDENSATION PRODUCTS.

1,151,113. Specification of Letters Patent. Patented Aug. 24, 1915.

No Drawing. Application filed August 19, 1912. Serial No. 715,738.

*To all whom it may concern:*

Be it known that I, HOWARD W. MATHESON, of Wilmington, in the county of New Castle, and in the State of Delaware, have invented a certain new and useful Improvement in Methods of Producing Condensation Products, and do hereby declare that the following is a full, clear, and exact description thereof.

My invention relates to a process of producing condensation products of organic compounds of different kinds, and is applicable to the production of condensation products of many different varieties within the field of organic compounds.

My invention is particularly applicable, however, to the production of condensation products of aldehydes and ketones, and especially to the production of acetaldol from acetaldehyde by the condensation of two molecules of acetaldehyde to produce one molecule of acetaldol, in accordance with the following equation:—

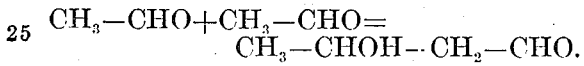

Prior to the time of my invention, such condensation products have been usually obtained by the use of different agents, preferably metallic salts such as the carbonates, cyanids or sulfites. The use of these substances is, however, attended with marked disadvantages owing to the fact that their action is very slow and the amount of condensation product obtained correspondingly small, and further, that their isolation from aqueous solutions is tedious and expensive. The metallic hydroxids could not be used for this purpose as their addition to acetaldehyde causes the formation of yellow resinous products, known as acetaldehyde resins. (See the *Lehrbuch der Organischen Chemie* of Meyer-Jacobson.) It has also been proposed, in an application of Harold Hibbert, to carry out the condensation by the use of solid metallic hydroxids in other solvents than water.

I have discovered a process of producing condensation products, particularly the production of acetaldol from acetaldehyde, in which a metallic compound, preferably a metallic hydroxid, may be used, by which much better results can be obtained than in any of the processes previously used. By means of my invention, I am enabled to obtain acetaldol by the use of a metallic hydroxid without any tendency to produce the resinous products ordinarily obtained by the action of metallic hydroxids. I have discovered that if the condensing agent is dissolved in a non-aqueous solvent containing little or no water, for example, sodium or potassium hydroxid dissolved in 98% ethyl alcohol, and the solution added to the acetaldehyde or other substance to be condensed, an improved yield of the acetaldol is obtained without relying on the use of any other solvent.

By the expression non-aqueous solvents, I mean a solvent other than water but which may nevertheless contain some water.

While my invention is capable of application to many condensation reactions, as one illustrative embodiment thereof I may proceed as follows: Two hundred grams of freshly distilled acetaldehyde boiling point 21° to 28° C. are cooled to a temperature substantially not below −20° C. and substantially not above +20° C., and then a 10% solution of caustic potash dissolved in ethyl alcohol slowly added, the contents being vigorously shaken. The product is then kept between substantially +5° and +10° C. for several hours, preferably not more than twenty-four. After neutralizing the free alkali present and filtering from the potassium or sodium salt, the product consists of pure acetaldol, mixed only with a slight amount of acetaldehyde, from which it can be readily freed, if desired, by a subsequent distillation under reduced pressure. While in the above example I have used ethyl alcohol and caustic potash, other alkalis or alkaline salts, for example, sodium ethylate may also be employed and either with or without the addition of water. Furthermore, other fatty or aromatic alcohols or polyhydric alcohols, such as glycerin and the glycols, may be substituted for the ethyl alcohol employed.

While I have described my invention above in detail, I wish it to be understood that many changes may be made therein without departing from the spirit of my invention.

I claim:

1. The process which comprises forming an aldol by bringing into contact with an aldehyde a non-aqueous solution of an alkali, the reagents mentioned being cooled to a temperature below 10° C.

2. The process which comprises forming an aldol by bringing into contact with an aldehyde an alcoholic solution of an alkali, the reagents mentioned being cooled to a temperature below 10° C.

3. The process which comprises forming an aldol by bringing into contact with an aldehyde, a non-aqueous solution of caustic potash, the reagents mentioned being cooled to a temperature below 10° C.

4. The process which comprises forming an aldol by bringing into contact with an aldehyde, an alcoholic solution of caustic potash, the reagents mentioned being cooled to a temperature below 10° C.

5. The process which comprises forming an aldol by bringing into contact with an aldehyde, a non-aqueous solution of an alkali, keeping the mixture cooled to a temperature below 10° C., neutralizing the free alkali, and separating the aldol from the remaining substances.

6. The process which comprises forming an aldol by bringing into contact with an aldehyde, an alcoholic solution of an alkali, keeping the mixture cooled to a temperature below 10° C., neutralizing the free alkali, and separating the aldol from the remaining substances.

7. The process which comprises forming an aldol by bringing into contact with an aldehyde, a non-aqueous solution of caustic potash, keeping the mixture cooled to a temperature below 10° C., neutralizing the free alkali, and separating the aldol from the remaining substances.

8. The process which comprises forming an aldol by bringing into contact with an aldehyde, an alcoholic solution of caustic potash, keeping the mixture cooled to a temperature below 10° C., neutralizing the free alkali, and separating the aldol from the remaining substances.

9. The process which comprises forming an aldol by bringing into contact with an aldehyde, a non-aqueous solution of an alkaline substance, the reagents mentioned being cooled to a temperature below 10° C.

10. The process which comprises forming an aldol by bringing into contact with an aldehyde, an alcoholic solution of an alkaline substance, the reagents mentioned being cooled to a temperature below 10° C.

11. The process which comprises forming an aldol by bringing into contact with an aldehyde, a non-aqueous solution of a caustic alkali, the reagents mentioned being cooled to a temperature below 10° C.

12. The process which comprises forming an aldol by bringing into contact with an aldehyde, an alcoholic solution of a caustic alkali, the reagents mentioned being cooled to a temperature below 10° C.

In testimony that I claim the foregoing I have hereunto set my hand.

HOWARD W. MATHESON.

Witnesses:
C. R. MUDGE,
A. M. GORMAN.